June 30, 1942.  A. E. AFF  2,287,956
SAUSAGE COOKER
Filed Jan. 2, 1941  3 Sheets-Sheet 1

INVENTOR.
Albert E. Aff,
BY
Chas. E. Townsend.
ATTORNEY

June 30, 1942. A. E. AFF 2,287,956
SAUSAGE COOKER
Filed Jan. 2, 1941 3 Sheets-Sheet 2

INVENTOR.
Albert E. Aff
BY Chas. E. Townsend,
ATTORNEY

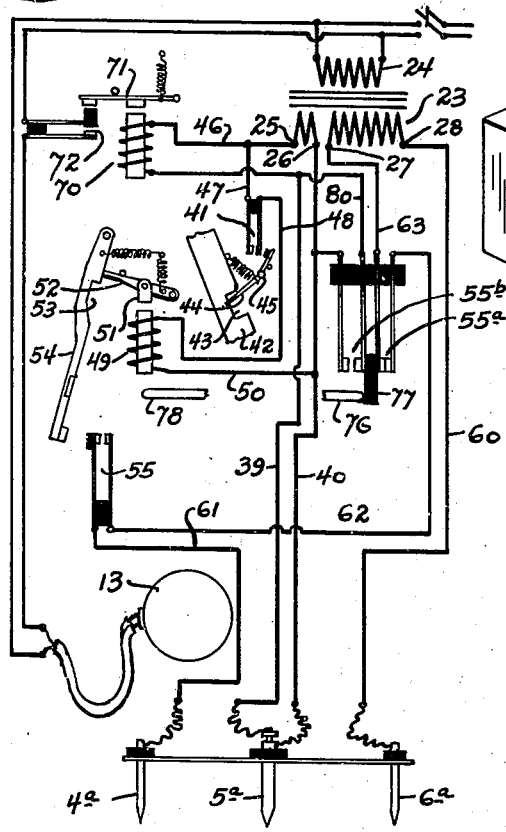

Patented June 30, 1942

2,287,956

UNITED STATES PATENT OFFICE 2,287,956

SAUSAGE COOKER

Albert E. Aff, Rockaway Beach, Calif.

Application January 2, 1941, Serial No. 372,769

3 Claims. (Cl. 219—19)

This invention relates to electrical cookers, and especially to a cooker or heater for sausages of the type commonly known as "hot dogs" or frankfurters.

The object of the present invention is generally to improve and simplify the construction and operation of cookers of the character described; to provide a cooker which is adapted to handle sausages placed within a bun, and where the bun and sausage are placed in a carton or other suitable form of wrapper or container; to provide a cooker wherein an electric current will be caused to flow through the sausage or article being cooked, and wherein the article functions as a resistance to a sufficient extent to be heated or cooked by the current; to provide a cooker in which electric terminals are caused to perforate and enter opposite ends of the sausage, to establish an electric circuit therethrough, and in conjunction therewith to provide a third perforating element, containing a thermostat actuated switch, said element entering the sausage in unison with the electric terminals and serving the function of breaking the circuit through the electric terminals and causing withdrawal of the same when the sausage reaches a predetermined temperature; and further, to provide a cooker which is entirely automatic in operation, and which delivers the packaged sausages one by one to the electric terminals, introduces said terminals and thermostat, closes an electric circuit through the sausage, breaks the circuit when a predetermined temperature is reached, withdraws the terminals and thermostat, and discharges the packaged sausages after cooking or heating.

The invention is shown by way of illustration in the accompanying drawings, in which Fig. 1 is a central vertical section of the sausage cooker;

Fig. 6 is a wiring diagram of the electrical parts of the apparatus;

Fig. 7 is a perspective view of the package containing the bun and sausage;

Fig. 8 is a cross section taken on line VIII—VIII of Fig. 7; and

Fig. 9 is an enlarged longitudinal central section of the thermostat container, the thermostat, and the switch mechanism actuated thereby.

Figure 1:
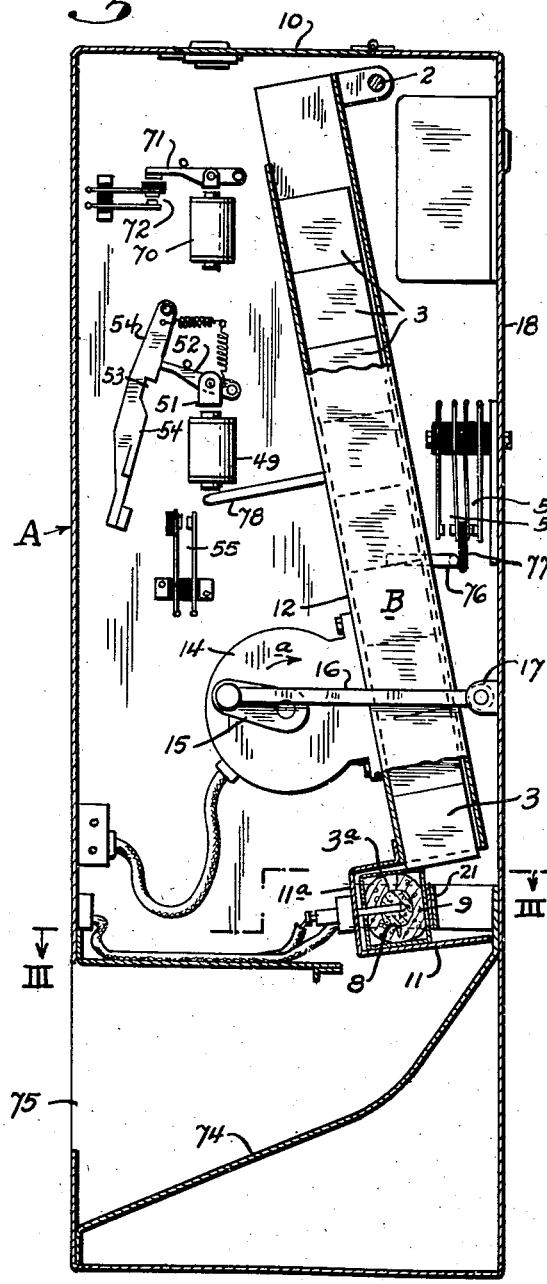
Figure 2:
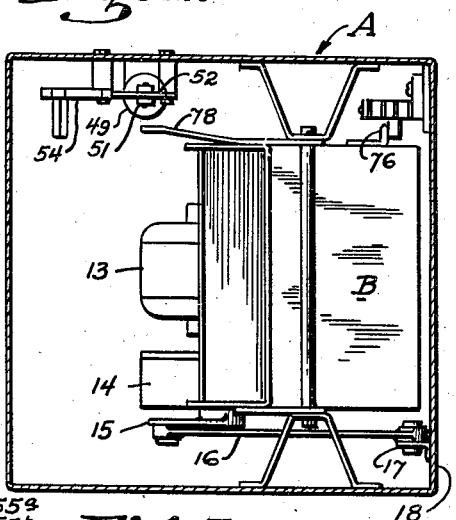
Fig. 2 is a plan view showing the housing cover removed.
Figure 3:
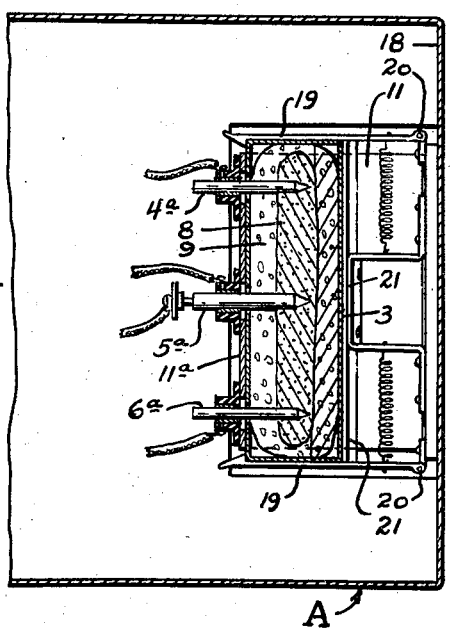
Fig. 3 is a horizontal section taken on line III—III of Fig. 1.

Referring to the drawings in detail, and particularly to Figs. 1 to 3, A indicates in general a rectangularly shaped vertically disposed housing, constructed of sheet metal or similar material. Pivotally mounted in the upper portion of the housing, as at 2, is a hopper or container B, in which may be placed, one above another, a plurality of packaged articles such as indicated at 3.

The type of package employed in the present instance is that shown in Figs. 7 and 8. These packages may be constructed of lightweight cardboard or like material; they are substantially square in cross section and approximately five or six inches in length. One side of each package has three openings 4, 5 and 6 formed therein, and a weakened tear line 7 is provided to permit quick and ready opening of the package. Each package contains a sausage 8 surrounded by a bun 9, and one of the features of the present invention is to provide means for removing the packages one by one from the lower end of the container B, heating the sausages and the buns surrounding them, and thereafter discharging the package.

The container B is rectangularly shaped in cross section throughout its length, and open at both the top and bottom. The housing A is provided with a hinged cover 10 which, when open, exposes the upper open end of the package receiving container, and permits refilling thereof from time to time. The packages thus introduced slide by gravity to the lower end, where they are supported by a U-shaped shelf 11. The lowermost package, or that indicated at 3a (see Fig. 4), first assumes the position there shown, but shortly thereafter it is transferred from that position to the position shown in Fig. 1, where it remains until it is heated and finally discharged. The manner in which this is accomplished will be as follows.

Suitably secured to the front face 12 of the hopper or container B is an electric motor 13. Connected therewith is a gear reduction housing 14, and driven thereby is a crank 15, which is connected by means of a link 16 with a bracket 17 secured to the rear wall 18 of the housing. When a circuit is closed through the motor, the crank will rotate in the direction of arrow $a$ one revolution, and during that revolution the housing will be swung from the position shown in Fig. 1 to the position shown in Fig. 4, and then back to the original position shown in Fig. 1, where it will come to rest, as the circuit through the motor will be broken. During this operation one package will drop onto the shelf 11, as shown at 3a in Fig. 4. During movement of the container B in the direction of arrow b, or towards the rear wall, the rear portion 11a of the U-shaped shelf will engage the package and force it between a pair of spring-actuated latch arms 19 (see Fig. 3) which are pivoted as at 20. At the same time a pair of electrodes 4a and 6a will pass through the openings 4 and 6 in the package, and will pass through the bun and enter the sausage to assume the position shown in Fig. 3, this perforation of the bun and sausage by the electrodes taking place during the final movement of the container B towards the rear wall, as the package containing the bun and sausage engages a striker plate 21 and will remain in engagement with this plate while the electrodes are entering. Simultaneously with the entrance of the electrodes 4a and 6a a tubular element 5a will also enter; that is, the electrodes 4a and 6a will enter opposite ends of the bun and sausage, while the element 5a will enter the center portion of the sausage. This element contains a thermostat element and a switch, and serves the function of closing a circuit, hereafter to be described, when the sausage reaches a predetermined temperature.

Current from the secondary 23 of a transformer (see Fig. 6) passes through the electrodes 4a and 6a, and the sausage proper. The sausage itself forms a resistance to the flow of current, and this resistance is utilized to develop the heat desired.

The transformer referred to may be mounted at any convenient point within the housing or at some point adjacent the same. In this instance it is shown as supported by the rear wall 18 of the housing (see Fig. 1). Current from any suitable source of supply, as a lighting circuit, enters the primary 24 of the transformer and induces the current in the secondary. The secondary has taps formed thereon as indicated at 25, 26, 27 and 28; the taps 27 and 28 are the high-voltage taps, and they supply current to the electrodes. The taps 25 and 26 are low-voltage taps, and the use to which the current supplied to them is put will be explained hereinafter.

Before explaining the several circuits that are formed, it might be well to explain the construction and operation of the thermostat element which enters the sausage in unison with the electrodes 4a and 6a. This thermostat element is best shown in Fig. 9. It consists of an outer tube of metal, such as indicated at 30, which may be enameled on its exterior surface to promote cleanliness and sanitation in use. Within this tube is mounted a second tube 31. In the inner end of this tube is supported a bimetallic thermostat element 32 which normally assumes the position shown in Fig. 9. Disposed within the tube 31 are two insulating sleeves 33, and supported thereby is a rod 34, the inner end of which is disposed adjacent the upper end of the bi-metallic thermostat element 32. The rod is, however, threaded as shown at 34, and by rotating the rod the inner point may be moved toward or away from the thermostat element, to increase or decrease the final temperature desired within the sausage.

In actual operation current from the low-voltage taps 25 and 26 of the transformer is delivered to the two terminals of the thermostat element, indicated at 37 and 38, by wires 39 and 40. No current flow through the thermostat will, however, take place until the thermostat reaches a certain temperature. As the temperature gradually increases, the element 32 will move in the direction of arrow c, and will finally engage the inner point of the rod 34, thus closing the circuit, and when the circuit is closed a circuit through the motor 13 will also be closed. To accomplish this a certain number of relays and other switches will be required, and before they are described it may be stated that the apparatus as a whole may be coin-controlled or manually controlled by means of a switch 41 (see Fig. 6). Mounted adjacent this switch is a coin chute, the lower end of which is shown at 42. The upper end of this chute will extend to the upper end of the housing A, and when a coin, for instance a ten-cent piece, is introduced it will fall by gravity to the lower end and then discharge into a container, not shown. During the downward travel of the coin it passes an opening 43; into this opening extends one end of a lever 44, pivoted at 45. The opposite end of the lever 44 is adjacent the points of the switch 41, and when a coin is dropped and engages the lever it swings the lever about the pivot and therefore forces it to engage and close the circuit through the switch 41.

This circuit can be traced as follows: Commencing with the low-voltage tap 25, the current flows through wires 46 and 47 to one terminal of the switch, and if the switch is closed it will flow out through the other terminal and wire 48, which connects with one end of a relay coil 49. The opposite end of the coil is connected with a wire 50, and this in turn is connected with the wire 40 and the other low-voltage tap 26, thus completing the circuit. When the coil 49 of the relay is energized by a flow of current, it attracts an armature 51 mounted on a pivoted lever 52. This is accordingly pulled downwardly, permitting the lever 52 to ride into a notch 53 formed in a lever 54. This lever is spring actuated, and its lower end engages and closes the contacts of a switch 55. This switch, together with a second switch indicated at 55a which is normally closed, closes a high-voltage circuit through the electrodes 4a and 6a, which can be traced as follows: Commencing with the high-voltage tap 28, the current passes through a wire 60 to the electrode 6a. It then passes longitudinally through the sausage and out through the opposite terminal 4a, then through a wire 61 to the contacts of the switch 55, and as these are closed it will pass through that switch and wire 62 which is connected with the switch 55a, and as this is closed it will flow through wire 63 to the opposite tap 27 of the transformer, thereby completing the circuit.

Figure 4:
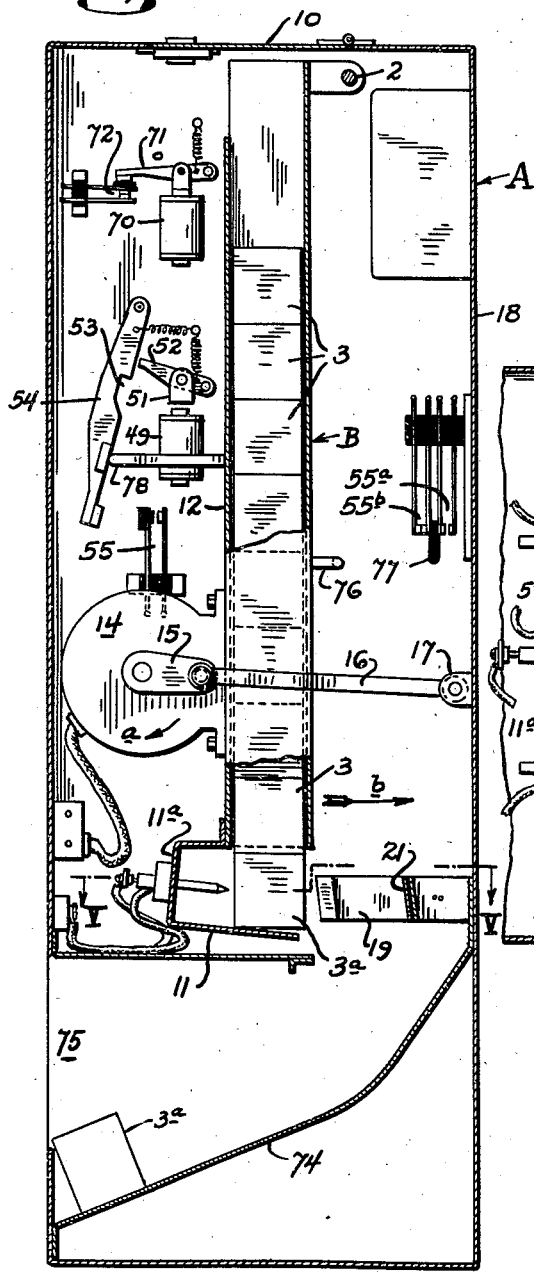
Fig. 4 is a section similar to Fig. 1 showing the position of the apparatus when one packaged sausage and bun has been heated and discharged, and the next one in succession dropped into position for the next cycle of operation.

After the current has been flowing through the sausage and the sausage is becoming heated due to resistance to the flow of current, the thermostat tube 30 also becomes heated, as it is embedded in the sausage. The bi-metallic strip 32 becomes heated and gradually moves in the direction of arrow c, and when the desired temperature has been reached, contact will be made with the inner point of the rod 34, and a new circuit will be formed through the wires 39 and 40. Wire 40, as already stated, connects with the low-voltage tap 26, and the wire 39 with the low-voltage tap 25. The current, however, before reaching the low-voltage tap 25, will have to pass through the coil 70 of a second relay switch, and then back to the tap 25 to complete the circuit. When there is a current flow in the coil 70, an armature mounted on a pivoted arm 71 is attracted. This arm engages the contacts of a switch 72, and this switch closes the main line circuit to the motor 13. Immediately, when the motor becomes energized, crank arm 15 starts rotation in the direction of arrow $a$, and the container B will commence to swing away from the rear wall, and at half-cycle of its movement will assume vertical position, as shown in Fig. 4. The package previously introduced between the latch arms 19 will drop from between them the moment the electrode terminals and the thermostat 5a are extracted, as the shelf 11 moves from under the latch arms 19. The package, thus released, drops onto an inclined chute 74, from which it may be removed by the purchaser through an opening 75. Shortly thereafter, the next package drops onto the shelf 11, as shown at 3a, and as the crank 15 completes the second half of its revolution the container will swing back to the position shown in Fig. 1, and the package will be pushed inwardly between the latch arms and retained thereby, and the electrodes and the thermostat element will again enter.

At this point a pin 76 will engage an arm 77 of the switch 55a, and will break a circuit through a second switch 55b mounted on the opposite side. Another pin is shown as mounted on the housing; this pin is indicated at 78. This will engage the arm 54 when the housing assumes the position shown in Fig. 4, and will thus return the arm to its normal position, or that shown in Figs. 1 and 6.

The operation of the pins 76 and 78 is important. To explain this importance it might be stated that when the coin is first dropped and actuates the lever 44 which closes the switch 41, this switch when closed closes the circuit through the relay 49 and thereby releases the arm 54 which closes the contacts of the switch 55. This switch, in cooperation with the switch 55a, closes the circuit through the electrode terminals 4a and 6a, and this circuit remains until broken by the thermostat. The circuit closed by the thermostat is the one which passes through the coil 70 of the motor switch, and when this is energized the motor switch 72 is closed, thereby closing the motor circuit. However, the moment the motor is energized, the container B begins to swing away from the rear wall 18; pin 76 moves in unison with it and away from the switch 55a, thus automatically breaking the heating circuit, that is, the circuit through the terminals 4a and 6a. At the same time, switch 55b closes, and this functions as a holding switch for the circuit already established by the thermostat switch. This circuit can be traced as follows: Current from the low-voltage tap 26 passes through wire 40 into the switch 55b, and as the contacts are closed it will pass out through the other terminal of the switch and wire 80, which connects with the coil of the relay 70; then passes through that coil and wire 46 back to the tap 25 of the low-voltage side of the transformer. That is, the moment the electrodes 4a and 6a and the thermostat tube 30 are pulled out of or extracted from the package, during movement of the container away from the rear wall 18, the thermostat immediately begins to cool, and as it first of all closed the circuit through the relay coil 70, it would break that circuit the moment it commenced to cool; hence the necessity of the holding switch 55b, as the motor might otherwise stop before it has completed its operation. However, by providing the holding switch 55b the motor circuit is maintained regardless of any cooling effect on the thermostat element, and as the motor operates, the housing will first assume its extreme outer position, shown in Fig. 4. At that point, pin 78 formed on the housing will engage the arm 54 of the relay coil 49, and swing it back to normal position, where it will be latched by the arm 52. All circuits are now broken with the exception of the motor circuit, and that circuit will not be broken until the crank 15 completes the last half of its revolution, or in other words returns the container to the position shown in Fig. 1. At that point, pin 76 engages the switch arm 55a, and the switch 55a is closed, while the switch 55b will be opened, and when this switch is opened it breaks the circuit through the relay coil 70 of the motor switch 72, thereby breaking the motor circuit and permitting the machine or apparatus as a whole to come to rest.

The structure employed is exceedingly simple, as all operations are controlled by the movement of the container toward and away from the rear wall. The mere insertion of a coin in the coin chute 42 closes the first preliminary circuit; this in turn closes other circuits, and the operation is thus completely automatic until the lowermost package has been perforated, heated, the electrodes again extracted and the package discharged, and all circuits are open, when the motor circuit is finally opened through switch 55b.

Figure 5:
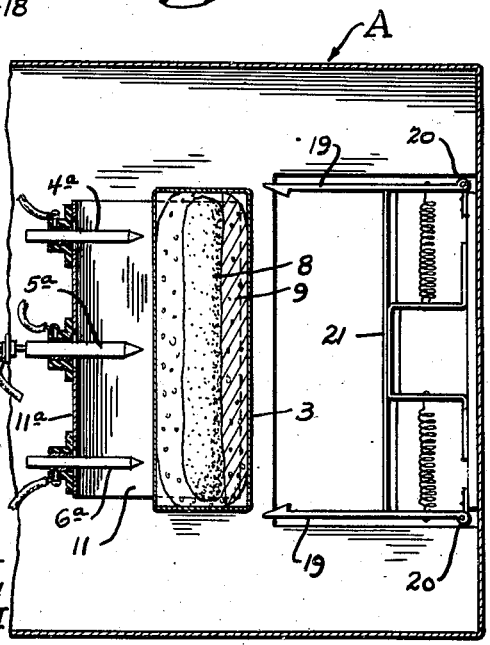
Fig. 5 is a horizontal cross section taken on line V—V of Fig. 4.

The openings 4, 5 and 6 in each package serve as guides to direct the electrodes and the thermostat element into proper position with relation to the sausage to be entered. The electrodes and the thermostat are of course supported by the rear wall of the U-shaped shelf 11, and they are insulated therefrom, as clearly shown in Figs. 3, 5 and 9. The electrodes 4a and 6a are preferably made of carbon, as burning of the sausage is thus prevented, due to the large surface contact, and furthermore as no metal is present there is no tendency toward the formation of chemical reactions which might impart taste and lower sanitation. The thermostat element, as previously stated, is preferably coated with porcelain on the outside, so this may readily be kept clean. The carbon electrodes may readily be removed from time to time for replacement or to permit them to be cleaned and sterilized, and this is also true of the thermostat element. All parts may thus be maintained in a sanitary condition, and as the apparatus is otherwise exceedingly simple the chance of any of the machinery getting out of order is rather remote.

While certain features of my invention have been more or less specifically described and illustrated, I nevertheless wish it understood that changes may be resorted to within the scope of the appended claims.

Having thus described and illustrated my invention, what I claim and desire to secure by Letters Patent is:

1. In an article cooker, a support, a substantially vertically disposed container adapted to receive a plurality of articles in stack formation, a pivoted connection between the upper end of the container and the support, a U-shaped bracket on the lower end of the container forming a support for the articles in the container, a pair of spaced electric terminals on said bracket, an article extractor adjacent the U-shaped bracket, means for imparting movement to the container about its pivoted support to move the lower end of the container to and away from the extractor, a backstop on the extractor causing the electric terminals to enter the lowermost article in the stack when the container is moved toward the extractor, means for closing an electric circuit through the terminals and the article to heat the article, means for breaking said circuit when the article reaches a predetermined temperature, and means actuated by movement of the container away from the extractor for releasing the heated article for discharge.

2. In an article cooker, a housing, a substantially vertically disposed container adapted to receive a plurality of articles in stack formation, a support secured to the lower end of the container to support the articles placed therein, a pair of spaced electric terminals secured to the support, an article extractor disposed adjacent the support, a pivotal connector between the upper end of the container and the housing, means for imparting a swinging movement to the lower end of the container to and away from the extractor, said movement of the container toward the extractor causing the lower-most article in the container to be engaged by the extractor and also causing the electric terminals to enter the article, means actuated by the movement of the lower end of the container toward the extractor for closing an electric circuit through the electric terminals, and the article to heat the same, means for breaking said circuit when the article reaches a pre-determined temperature, and means actuated by movement of the container away from the extractor for releasing the heated article for discharge from the extractor.

3. In an article cooker, a housing, a substantially vertically disposed container adapted to receive a plurality of articles in stack formation, a support secured to the lower end of the container to support the articles placed therein, a pair of spaced electric terminals secured to the support, an article extractor disposed adjacent the support, a pivotal connection between the upper end of the container and the housing, an electric motor, means actuated by the motor for imparting a swinging movement to the lower end of the container to and away from the extractor, means for closing a circuit through the motor to cause movement of the container toward the extractor, said movement causing the lower-most article to be engaged by the extractor and the electric terminals to enter the article, means for breaking the circuit through the motor and simultaneously closing a circuit through the terminals and the article to heat the article, other means for breaking the circuit through the terminals and the article when a predetermined temperature is reached and for again closing the circuit through the motor to cause the lower end of the container to swing away from the extractor to withdraw the terminals from the article, and means actuated by movement of the container away from the extractor for releasing the heated article from the extractor and for breaking the circuit through the motor when the container has returned to substantially vertical position.

ALBERT E. AFF.